United States Patent [19]

Bruensicke

[11] 4,391,017

[45] Jul. 5, 1983

[54] DEVICE FOR REMOVING INCENDIARY MATTER FROM THE INTERIOR OF AN AIRCRAFT

[75] Inventor: Wilhelm A. Bruensicke, Santa Monica, Calif.

[73] Assignee: Lockheed Corporation, Burbank, Calif.

[21] Appl. No.: 335,178

[22] Filed: Dec. 28, 1981

[51] Int. Cl.³ .............................. A47L 5/18; A47L 5/38
[52] U.S. Cl. ........................................ 15/313; 15/314; 15/409; 15/410; 15/415 R; 138/89
[58] Field of Search ............ 15/313, 314, 419, 415 R, 15/410, 409; 285/7; 138/89

[56] References Cited

U.S. PATENT DOCUMENTS

| | | | |
|---|---|---|---|
| 1,445,930 | 2/1923 | Barringer | 15/313 |
| 1,499,937 | 7/1924 | Leathers | 15/313 X |
| 1,674,535 | 6/1928 | Verville | 15/409 X |
| 1,722,265 | 7/1929 | Beaulieu | 15/313 X |
| 1,738,065 | 12/1929 | Grathwol | 15/313 X |
| 1,801,966 | 4/1931 | Maddocks | 15/313 |
| 2,218,265 | 10/1940 | Nathan | 237/12.3 |
| 2,299,668 | 10/1942 | Webster | 15/313 X |
| 2,362,675 | 11/1944 | Stebbins | 138/89 |
| 2,373,916 | 4/1945 | Replogle | 15/409 X |
| 2,387,708 | 10/1945 | Arnhym | 93/20 |
| 2,428,585 | 10/1947 | Rogers | 285/105 |
| 3,384,916 | 5/1968 | Hockin | 15/313 |
| 3,431,581 | 3/1969 | Booth | 15/313 |
| 3,568,240 | 3/1971 | Hamrick | 15/314 |

Primary Examiner—Chris K. Moore

Attorney, Agent, or Firm—Louis L. Dachs; John M. May

[57] ABSTRACT

Flammable fluid or other incendiary matter (204) contained aboard an aircraft may be removed from the aircraft's interior by means of a special purpose disposal device that utilizes the differential in pressure between the pressurized interior of a modern aircraft and the external airstream. The device itself comprises a main intake nozzle, an intermediate wand portion which is connected to the intake nozzle and in fluid communication therewith and a flexible hose provided with a quick connect fitting for connecting the device to a suitable outlet fitting in the skin of the aircraft. Preferably, several such outlet fittings are provided so that the device can be utilized at different locations within the aircraft's interior without requiring an excessively long hose. Each of the outlets is normally closed by means of a disk-shaped plug held in a flush position with respect to the aircraft's outer surface by means of a removable retainer ring. The plug itself is provided with an ejecting mechanism which may be a pyrotechnic fuse in the vicinity of the disk's periphery which, when activated, ejects the central portion of the plug into the external airstream. In order to make the device more convenient to use during the emergency conditions for which it is intended, it may be equipped with a balanced flow regulator that may be operated by a cabin attendant with minimal force and which will nevertheless accurately regulate the force with which the nozzle will pick up fluids and other incendiary material.

9 Claims, 12 Drawing Figures

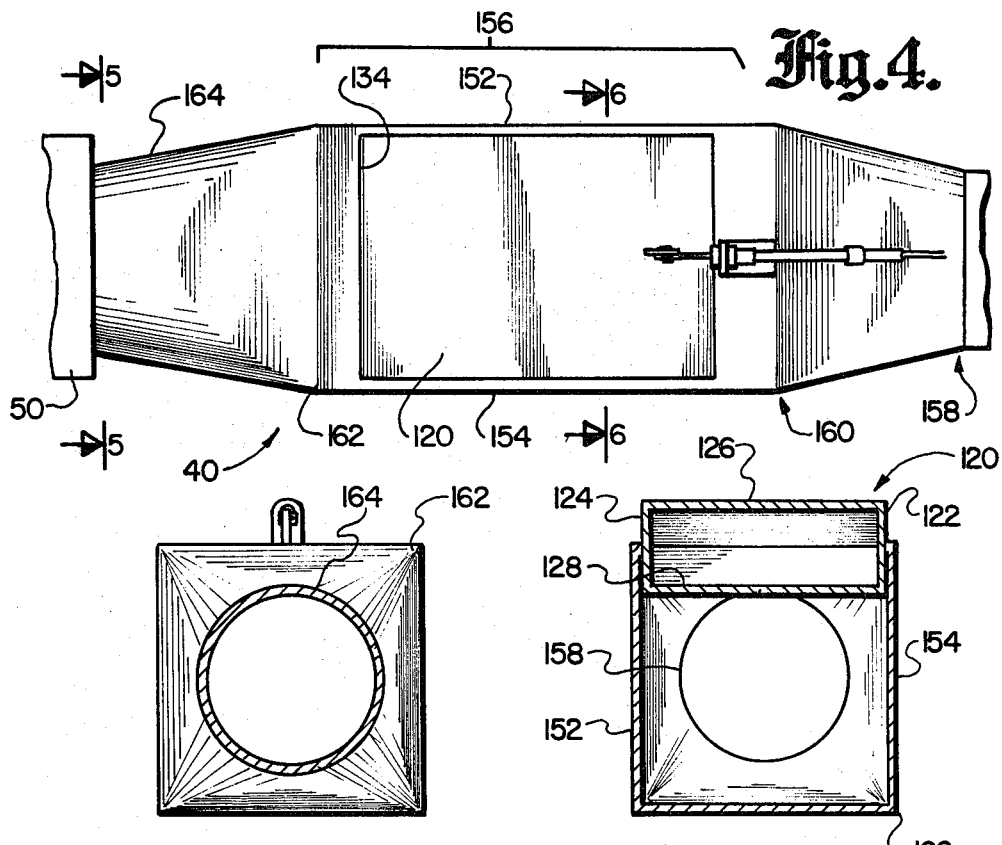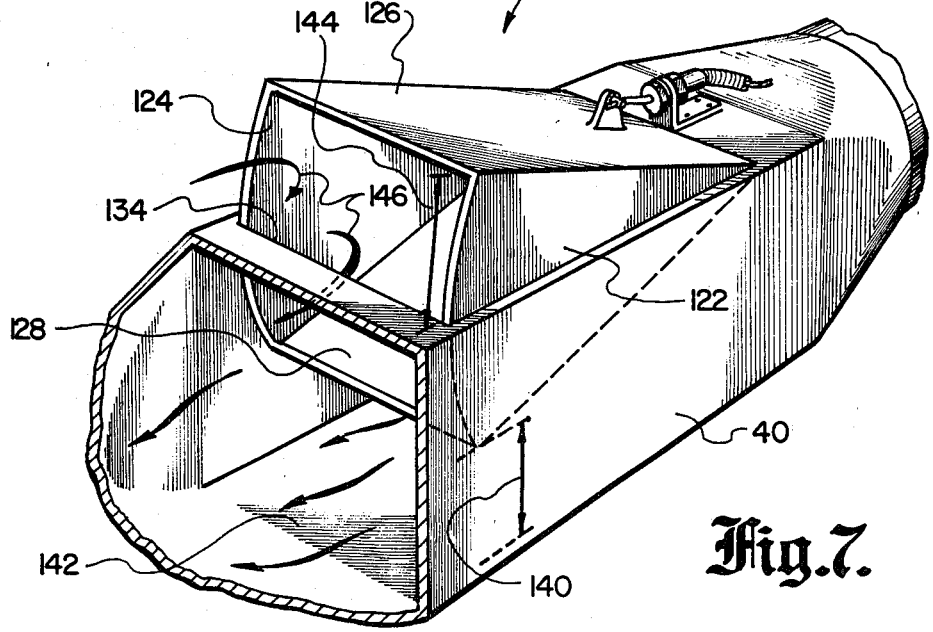

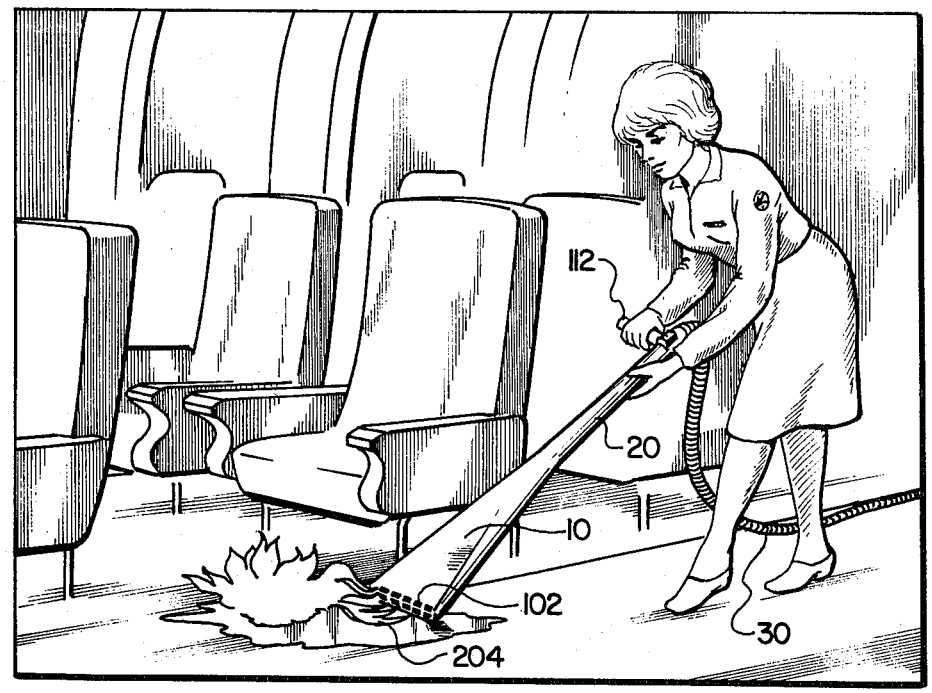
Fig.10.
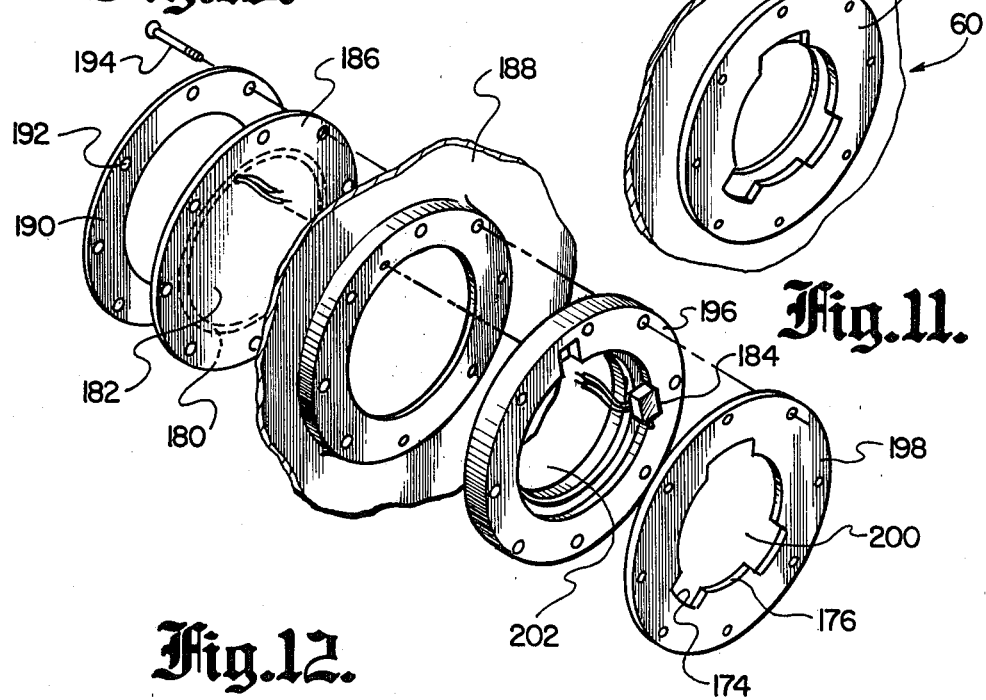
Fig.11.
Fig.12.

DEVICE FOR REMOVING INCENDIARY MATTER FROM THE INTERIOR OF AN AIRCRAFT

TECHNICAL FIELD

The present invention relates generally to fire suppression equipment and more particularly to a novel device for utilizing the pressure differential between the interior of an aircraft and the external airstream to dispose of flammable fluids and other incendiary material from the interior of the aircraft.

BACKGROUND ART

Vehicle vacuum cleaning systems are known wherein an outlet fitting is provided within the interior of an automobile to which may be attached a flexible hose and nozzle. The outlet is in communication with an electric vacuum pump or a Venturi operated by the exhaust pipe of the vehicle or the vacuum created within the intake manifold of an internal combustion engine. The purpose of such a vacuum device is to assist in the normal cleaning and maintenance of the passenger compartment of the vehicle. U.S. Pat. Nos. 1,445,930, 1,499,937, 1,722,265, 1,801,966, 2,218,265, 3,384,916 and 3,431,581 are cited as exemplary of such automotive vacuum cleaning apparatus.

It has also been proposed to provide aircraft with Venturi fittings on its outer surface such that a suction effect will be created while the aircraft is in flight that may be utilized to remove stale air, noxious fumes, body wastes, etc. from the interior of an aircraft. U.S. Pat. Nos. 2,362,675, 2,387,708, and 2,428,585 are cited as exemplary of such suction outlet fittings located on the skin of an aircraft.

It will be appreciated that flammable fluids and other incendiary matter constitute a major safety hazard to the airline industry. Accordingly, passengers are prohibited from including such materials in their carry-on luggage. However, such regulations are difficult to enforce.

Thus, as the volume of passenger air traffic increases throughout the world, there is an ever increasing likelihood that flammable fluids and other incendiary material will be brought aboard the aircraft—perhaps innocently by an unknowing passenger or perhaps intentionally by a determined terrorist—and that such material will be ignited while the aircraft is airborne. In the event of such an emergency, there is presently no effective response. The pressurized cabin of the aircraft is for all intents and purposes sealed and even if the crew were able to open a cabin door or window, the resultant rush of cabin air out of the door opening would pose a major hazard to the passengers and crew. Furthermore, once an extremely flammable material has been ignited, it cannot readily be put out with the limited fire fighting equipment available to the crew.

However, the known prior art does not teach or suggest that a suction or vacuum cleaner type of device could be adapted to remove burning incendiary matter from the interior of an aircraft. As a matter of fact, neither the known prior art type of vehicle vacuum cleaning apparatus nor the known prior art type of Venturi discharge orifices for aircraft would be suitable for such an application, since the individual components of the vacuum cleaner mechanism would themselves be consumed or otherwise damaged by the fire and since the prior art Venturi orifices and their associated closures do not provide a safe exit path for flammable fluids and smoke from a pressurized vessel.

Accordingly, a principal objective of the present invention is to provide a relatively lightweight and easy to use device with which the cabin crew may safely remove incendiary matter from the interior of an aircraft even if it is already ignited.

It is a related objective to provide such a device with an intake nozzle and a flexible hose whereby it may be conveniently guided to pick up fluids and other incendiary material from various locations within an aircraft cabin.

It is another related objective to provide such a device with a flow regulator and an outlet fitting whereby a plug normally flush mounted with the skin of an aircraft may be ejected after the device is connected to the outlet and whereby the operator of the device may easily regulate the nozzle or shut off the flow through the nozzle in accordance with the needs of the emergency.

Other objectives and advantages will become apparent from the description of the invention and a presently preferred embodiment thereof which follows.

DISCLOSURE OF INVENTION

In accordance with the teachings of the present invention, a flammable fluid or other incendiary matter contained aboard an aircraft may be removed from the aircraft's interior by means of a special purpose disposal device that utilizes the differential in pressure between the pressurized interior of a modern aircraft and the external airstream at the elevations at which the aircraft is being operated.

The device itself comprises a main intake nozzle, an intermediate wand portion which is connected to the intake nozzle and in fluid communication therewith and a flexible hose for connecting the end of the intermediate wand portion remote from the intake nozzle to a suitable outlet fitting in the skin of the aircraft.

Preferably, a quick connect fitting is utilized to effect the actual connection between the hose and the outlet so that the device can be utilized at different locations within the aircraft's interior without requiring an excessively long hose.

In order to make the device more convenient to use during the emergency conditions for which it is intended, it is preferably equipped with a self-equalizing flow regulator that may be operated by a cabin attendant with minimal force and which will nevertheless accurately regulate the force with which the nozzle will pick up fluids and other incendiary material. The flow regulating device may also be utilized to conveniently and easily shut off the flow through the nozzle altogether in order that there will be no aerodynamic forces tending to block the nozzle with burning debris and the like so that the debris may be conveniently shaken off and the proper function of the nozzle restored.

By means of such a device, the energy stored inside the aircraft's interior as a result of its pressurization is harnessed to assist in fighting fires arising in the interior and in particular fires involving flammable fluids, which are difficult to fight by conventional means; moreover, the device is of relatively light weight and can readily be stored aboard an aircraft without significant weight penalty.

In accorance with other aspects of the preferred embodiment, each of the outlets provided in the skin of the aircraft is normally closed by means of a disk-shaped plug held in a flush position with respect to the aircraft's outer surface by means of a removable retainer ring. The plug itself is provided with an ejection mechanism which may be a pyrotechnic fuse in the vicinity of its periphery which, when activated, detaches the central portion of the plug into the external airstream.

BRIEF DESCRIPTION OF THE DRAWINGS

FIG. 4 corresponds generally to FIG. 2 but is a top plan view of the flow regulator;

FIG. 5 is a cross section through the connector end of the flow regulator at the point indicated by the arrows 5—5 in FIG. 4

FIG. 6 is a cross section through the flow regulator near the middle thereof as indicated by the arrows 6—6 in FIG. 4;

FIG. 7 is a perspective partially cutaway view showing the flow regulator in the same intermediate position as was shown in FIG. 3;

FIG. 10 shows the invention in use during a fire emergency aboard an aircraft;

FIG. 11 is a perspective view of the assembled outlet fitting as it appears from the interior of the aircraft;

FIG. 12 is an exploded isometric view showing the various components of the outlet fitting in relation to the skin of the aircraft, including an electrically activated fuse for removing the plug.

BEST MODE FOR CARRYING OUT THE INVENTION

Figure 1:
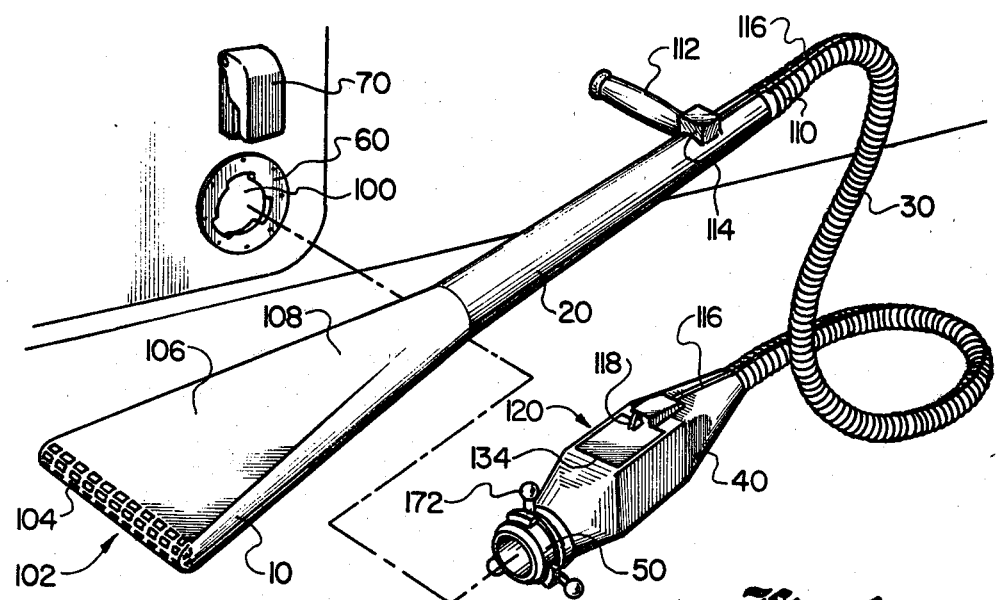
FIG. 1 is a perspective view showing the various major components of a presently preferred embodiment.

Referring now specifically to FIG. 1, which it will be recalled is a perspective view of a presently preferred embodiment of the present invention, it may be seen that the major components of such a suction device are a main intake nozzle portion (10), an intermediate wand portion (20), a flexible hose (30), a flow regulator (40) and a quick connect fitting (50). By means of the quick connect fitting (50) the device may be readily connected to one or more outlet fittings (60) provided in the skin of the aircraft and accessible from its interior, each of the outlet fittings being provided with a switch or other suitable means (70) for releasing a disk-shaped plug (100) that normally is held in a flush position with respect to the aircraft's outer surface.

Modern aircraft are conventionally equipped with a cabin pressurization system designed to overcome the low pressure rarefication effects—and in particular the lack of adequate concentrations of oxygen—associated with the higher altitudes at which modern aircraft are designed to operated and at which they may achieve their best performance and efficiency. In order to minimize discomfort to the passengers and crew, it is desirable that changes in cabin pressure be as gradual as possible, even when the aircraft is rapidly climbing to its operational elevation or rapidly descending therefrom in preparation for landing; accordingly, the aircraft's pressurization system is in operation whenever the aircraft is in flight and there is a normally resultant differential between the pressure in the cabin and the pressure in the free airstream surrounding the aircraft.

The present invention takes advantage of this pressure differential and the resulting energy that is stored thereby inside the aircraft by providing a defined flow path from the pressurized interior of the aircraft to the external free airstream such that a suction effect is created that will pick up incendiary matter and eject it through the boundary layer at the aircraft's surface where it no longer poses any hazard. The flow regulator (40) regulates the magnitude of this flow—or more properly the proportion thereof flowing through the opposite portions of the device.

Still referring to FIG. 1, it will be noted that the nozzle portion (10) is provided with an elongated rectangular intake opening (102) covered b means of a coarse grill (104), the purpose of which is to prevent the device from becoming clogged by solid debris and thus reducing its effectiveness. The overall configuration of the nozzle portion (10) is such that there is a transition in cross section from an elongated rectangular forward end (106) to a generally circular rearward end (108), the transition from the elongated rectangular cross section to the circular cross section being gradual and smooth so as not to result in protrusions and crevices which could trap small bits of debris that is sucked through the openings in the grill (104).

At the rear end (108) of the nozzle portion (10) is the aforementioned wand portion (20) which it will be noted continues the same generally circular cross section up to the connection (110) between the wand portion (20) and the flexible hose (30). The wand portion (20) is additionally provided with a control handle (112) securely mounted at the upper end thereof so that the device can be conveniently held and operated by an airline cabin attendant in the manner described in more detail hereinafter with particular reference to FIG. 10.

As shown in the Drawings, the control handle (112) is free to rotate about its longitudinal axis and this rotational motion is converted by a suitable gear arrangement (114) into a back and forth movement of a Bowden cable (116). This Bowden cable (116) is secured along the length of the flexible hose portion (30), but being itself flexible does not significantly inhibit the flexing action of the flexible hose (30). The end of the Bowden cable (116) remote from the handle (112) is secured to a control arm (118) of a pivoting flap valve (120) contained within the flow regulating portion (40) (see also FIGS. 2, 3, 4 and 7).

Since the suction device illustrated in FIG. 1 is intended to be utilized for transporting flammable fluids and other incendiary material from the interior of the aircraft to the external airstream, it will be appreciated that the material utilized in the suction device should be resistant to the destructive effect of heat and combustion. Furthermore, sufficient heat insulation should be provided between the interior of the device heated by the burning material flowing therethrough and those exterior portions which could come in contact with the unprotected arms and legs of the aircraft's cabin attendants and passengers as well as with other combustible and/or heat intolerant objects that may be found within the aircraft.

Accordingly, the intake nozzle portion (10) and the wand portion (20) are preferably made of a lightweight metal, such as aluminum, with at least the wand portion (20) having an outer heat shield so that a relatively cool outer surface is presented to the operator. A similar consideration exists for the flexible hose (30) which preferably is constructed with a fire resistant metallic inner skin surrounded by one or more layers of flexible insulating material which then may be covered with a relatively tough but, nevertheless, flexible outer skin.

With respect to the flow regulating portion (40), when in actual use, it will be held in a fixed location relative to the outlet (60) by means of the quick connect fitting (50). Accordingly, the outer surfaces of the flow regulator (40) need not be as well insulated as the wand portion (20) and the flexible hose portion (30), since as a result of the proper location of the outlet (60), the flow regulator (40) is not likely to come into direct contact with the unprotected skin of a passanger or attendant. However, it also should be fabricated from a lightweight fire resistant material, such as aluminum.

Figure 2:
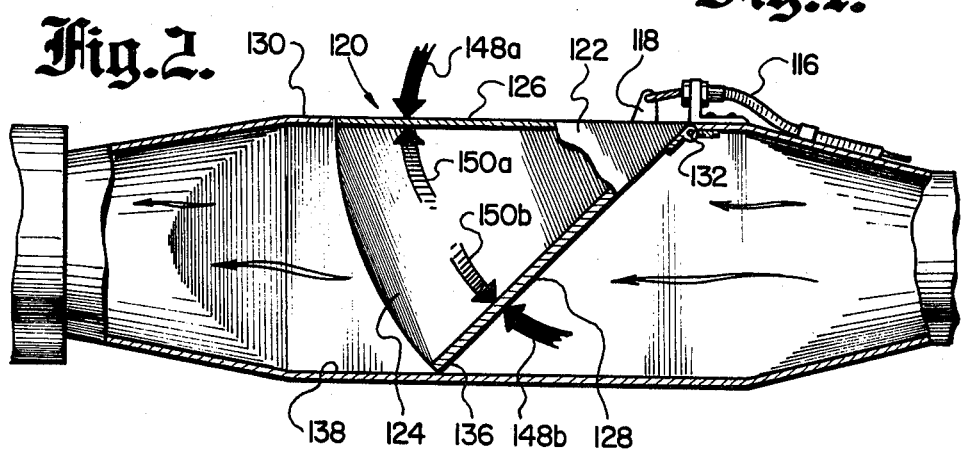
FIG. 2 is an enlarged partially cutaway side elevational view of the flow regulator portion provided between the end of the flexible hose and the quick connect fitting.
Figure 3:
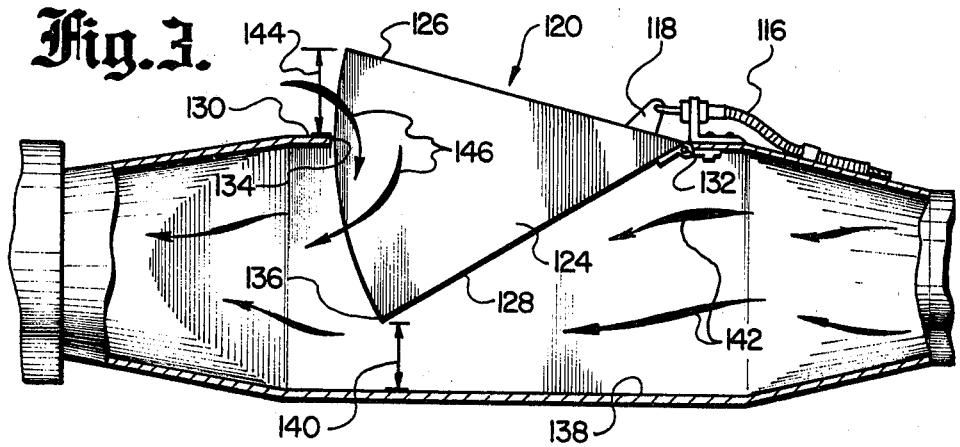
FIG. 3 is similar to FIG. 2 but shows the flow regulator in an intermediate position.

Referring now specifically to FIGS. 2 and 3, which are respectively side elevational views of the flow regulator portion (40) in its closed position and in an intermediate position, the mechanical connection between the end of the Bowden cable (116) and the control arm (118) provided as part of the regulator flap valve (120) can be seen in more detail. Furthermore, it can be seen that the flap valve (120) is in the shape of a triangular wedge having a hollow interior.

More particularly, the flap valve (120) comprises a pair of parallel side panels (122, 124), each in the shape of a segment of a circle bordered by two intersecting radial lines and connected by an arc, with their respective upper radial borders being connected by a first generally rectangular flat panel (126) and their respective lower radial borders being connected to each other by a second rectangular flat panel (128).

The flap valve (122) is pivotally mounted to an upper surface (130) of the flow regulator assembly (40) by means of a hinged joint (132) connecting the forward end of a rectangular opening (134) formed in said upper surface (130) with the apex of the wedge formed by the intersecting first and second flat panels (126, 128). The dimensions of the flap valve (120) relative to the internal cross section of the regulator valve assembly (40) are such that when the Bowden cable (116) is displaced to its full rearward extent, the first flat panel (126) is parallel with the regulator's upper surface (130) and has essentially blocked its upper opening (134), while at the same time the lower panel (128) has its rear edge (136) in contact with the regulator assembly's lower internal surface (138). Accordingly, all flow from the hose portion (30) to the quick connect fitting (50) will be cut off, as is best seen in FIG. 2.

FIG. 3 shows the flap valve (120) in an intermediate or partially open position in which its lower edge (136) is spaced from the regulator's bottom surface (138) to define a variable passageway (140) for the flow of air, flammable fluids, debris, etc. from the intake nozzle (102), as indicated in the Figure by a first set of arrows (142). It will be seen that because the lower flat panel (128) is rigidly linked to the upper panel (126) by means of the two side panels (122, 124), there is also defined a variable compensating opening (144) between the upper panel (126) and the upper surface (130), thus permitting a compensating flow, indicated in the Figure by a second set of arrows (146) through the compensating opening (144) to the connector (50) (see also FIG. 7).

Thus it will be seen that the flow regulator (40) provides a balanced action whereby in its closed position (FIGS. 1 and 2), there is no net static force tending to open or close the valve, and thus a minimum of effort is required by the operator to rotate the control handle (112) and thus open the control flap (120) to permit the suction function of the device to be activated. This absence of net static forces is shown symbolically in FIG. 2. Heavily shaded arrows (148a, 148b) represent the greater pressures inside the aircraft cabin exerted on the upper surface of the upper flat panel (126) and on the lower surface of lower flat panel (128). Since the two panels are of substantially equal area, accordingly the associated torques about the hinge (132) cancel out each other. A similar situation exists with respect to the reduced pressure of the external airstream, represented in the Figure by the lightly shaded arrows (150a, 150b), which exerts its force on the lower surface of the top panel (126) and on the upper surface of the lower panel (128). Again, it will be seen that the resultant net torque about the hinge (132) is zero.

Referring now to the situation shown in FIGS. 3 and 7, wherein the flap valve (120) is in an intermediate position such that there is now a flow of air, etc. from the higher pressure inside the cabin to the lower pressure outside the aircraft, it will be seen that this flow has two substantially equal components, namely: (a) the flow originating with the nozzle (10) (symbolized by the first set of arrows (142); and (b) the bypass flow (symbolized by the second set of arrows (146)). Since each of these two flows is subject to an approximately equal restriction, respectively the control opening (140) and the bypass opening (144), it follows that the dynamic forces on each side of the flap valve (120) will tend to cancel out one another.

Reference should now be made to FIGS. 4, 5 and 6 showing the cross-sectional configuration of the regulator device (40). In particular, it should be understood that with the type of balanced flow regulator discussed previously with references to FIGS. 2, 3 and 7, the proper operation of the wedge-shaped flap valve (120) requires that its side walls (122, 124) remain in close contact with the respective side walls (152, 154) of the regulator housing (see especially FIG. 6). Thus, the flow regulator's intermediate portion (156) is preferably of rectangular (or square) cross section. On the other hand, a circular cross section is preferred for the flexible hose (30) and the connector (50), since, as a general rule, a circular cross section provides a greater area and thus a greater flow rate. However, it is important that the flow path through the device be as smooth as possible. For this reason the flow regulator portion (40) provides a gradual change in the cross section from the circular inlet (158) to the square cross section (160) at the beginning of the valve area (120), as well as from the rear square cross section (162) to the circular cross section (164) prior to the connector (50) (see also FIG. 8).

Figure 8:
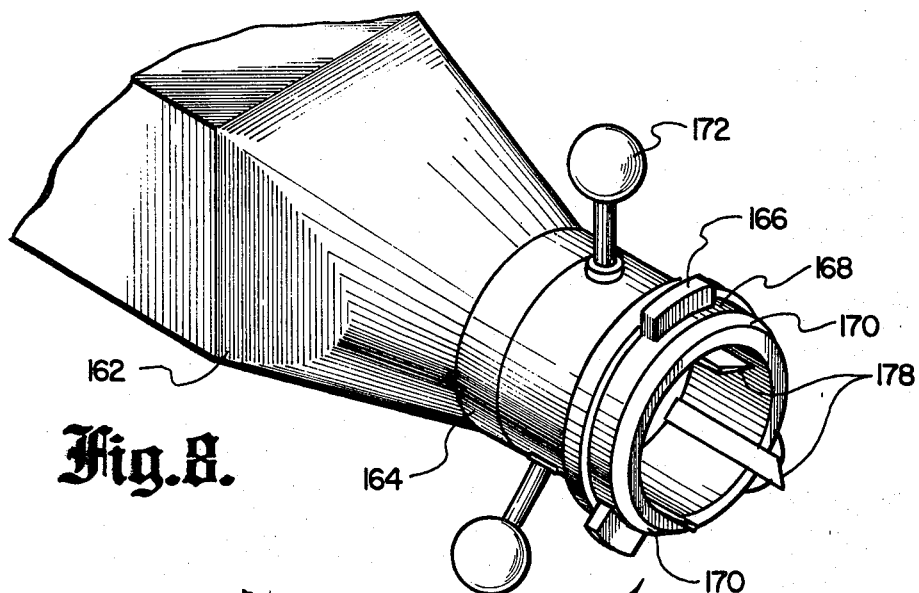
FIG. 8 is a perspective view of the quick connect fitting provided in the flow regulator remote from the flexible hose to which has been added an alternative mechanical cutting means for removing the plug within the outlet.

It should be understood that the operation of the device should be as simple as possible, since it is intended to be used by an individual with relatively little fire fighting experience or training and will be utilized in an emergency situation wherein the cabin attendant can be expected to be subject to considerable stress. For this reason, as best seen in FIG. 8, the quick connect fitting (50) is provided with three radially extending bayonet prongs (166) extending from a circular collar (168) provided with a beveled edge (170). Aligned with each of the three prongs (166) is a handle (172), by means of which it is possible both to align the prongs (166) with the corresponding openings (174) provided in the outlet fitting (60) and to rotate the prongs (166) with respect to the outlet fitting's inwardly projecting connecting portions (176), whereby the connector (50) will be securely locked in place. Thus, it is a relatively natural and simple procedure to insert and secure the connector (50) inside the outlet fitting (60).

It will be recalled that a disk-shaped plug (100) is provided as part of the outlet (60) to close the outlet opening under normal conditions. Accordingly, a simple and reliable means should be provided for removing this plug when it is necessary to use the device. The Drawings show several alternative such means. Referring again to FIG. 8, it may be seen that one such means is purely mechanical and comprises one or more cutting blades (178) connected to the handles (172) by an appropriate linkage (not shown) so as to be extended into contact with the disk (100) once the connector (50) has been inserted into the outlet (60) in response to the continued rotation of the handles (172), thereby piercing the disk (100) and cutting a circular path about its periphery, whereupon the disk (100) will be forcibly ejected by the difference in pressure.

Figure 9:
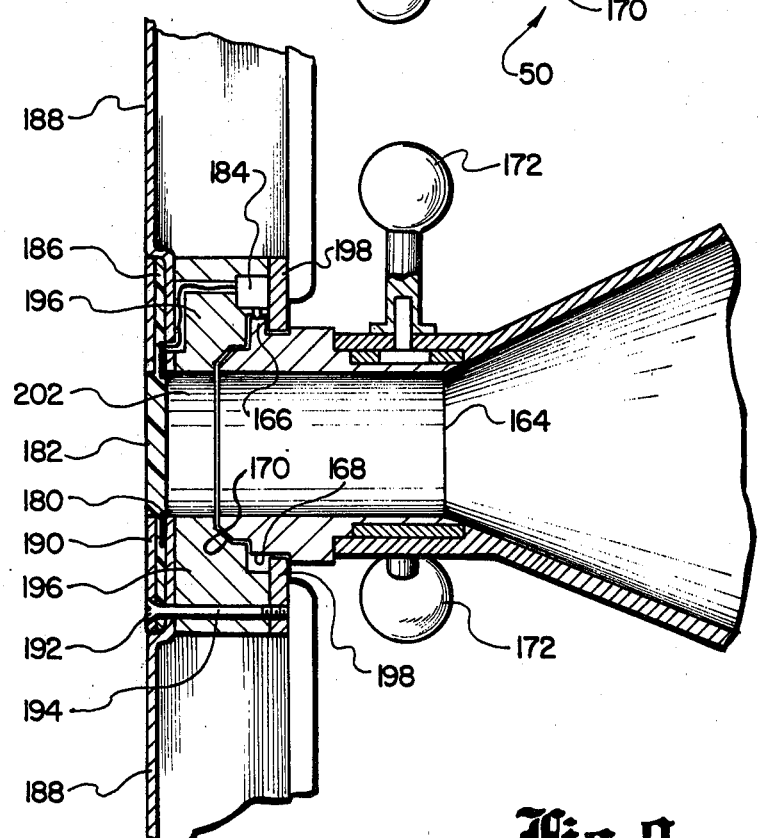
FIG. 9 is a cross-section view showing the quick connect fitting coupled to an outlet fitting provided in the skin of the aircraft showing an alternative electrical switching means for removing the plug.

FIGS. 9 and 12 show a somewhat different means for causing the ejection of the disk (100), namely, a pyrotechnic ring (180) provided near the disk's periphery (186). When a source of electric current is applied to this pyrotechnic ring, a corresponding annulus will be melted through the disk (100) and accordingly the disk's central portion (182) will be ejected by the pressure differential. The activation of the pyrotechnic ring should preferably be interlocked with the proper installation of the connector (50) into the outlet (60), so that the disk (100) will not be removed thereby causing a potentially noisy and dangerous outflow of air which could frighten the cabin attendant or even physically prevent her from connecting the device to the outlet (60). To this end, there may be provided a suitable electrical contact (184) (FIG. 9) operated by one of the bayonet lugs (166) once the connector (50) has been properly installed. As an additional safety measure, a manually operated second switch (70) (FIG. 1) could be included in the circuit. Alternatively, for the sake of simplicity, the interlocking contact (184) could be dispensed with, in which case the manual switch (70) should be provided with a suitable warning label cautioning against its operation prior to the proper installation of the connector (50).

A preferred form of construction for the outlet fitting (60), including the method by which the disk-shaped plug (100) may conveniently be installed, is best shown in FIGS. 9, 11 and 12. It will be noted from the cross-sectional view of FIG. 5 that the central portion (182) of the plug (100) protrudes outward from the periphery portion (186). Thus the plug (100) may be held in its preferred flush mounted configuration with respect to the outer skin (188) of the aircraft by means of an annular retaining ring (190) equal in thickness to the difference in thickness between the disk's thicker central portion (182) and its peripheral portion (186) (see also FIG. 12). The annular retaining ring (190) is provided with a series of countersink apertures (192). The retaining ring (190) and the disk (100) thus may be firmly held in place by means of bolts (194) passing through these apertures (192) and through a spacer (196) and a coverplate (198). The coverplate (198) is provided with three equally spaced notches (174) extending outwardly from a circular opening (200); the spacer (196) is also provided with a central opening (202). When the coverplate (198) is secured in place against the spacer (196), and the bolts (194) tightened into suitable threaded apertures in the coverplate (198), there accordingly is defined an appropriate bayonet recess by means of which the bayonet connector (50) may be quickly and securely fastened thereto, thereby providing a smooth flow passageway from the circular end (164) of the flow regulator (40) through the central aperture (202) of the spacer (196) and the the plug's peripheral portion (186), which has, in the meantime, been separated from its middle disk (182) by means of, for instance, an electric current through the pyrotechnic ring (180) embedded in the disk (100).

The construction of a device in accordance with the present invention (and of some possible alternative embodiments of particular components thereof) having now been discussed in sufficient detail to permit the average artisan to construct such a device for removing incendiary matter from the interior of an aircraft, the method that such a device may preferably be used will now be discussed with particular reference to FIGS. 1 and 10.

Normally, the stowable portions of the device, namely, the nozzle (10), the wand (20), the hose (30), the flow regulator (40) and the quick connector (50) (including the various above-described attachments and components thereof) will be permanently assembled into a single unit so that in the event of a fire emergency aboard the aircraft, no time will be wasted in attempting to assemble the device or in looking for individual components thereof; accordingly, all that is necessary to prepare the device for use during a fire emergency is (a) to remove the device as a unit from its normal storage location, (b) to insert the connector fittin (50) into the outlet fitting (60) most conveniently located to the site of the emergency, (c) to secure the connector firmly in place by means of the handles (172) and (d), if a manual switch (70) is provided for ejecting the middle portion (182) of the plug (100), to operate the switch. Once this has been accomplished, the device is supported in its operational position with the left hand holding the wand portion (20) and the right hand holding the control handle (112). The handle (112) is then rotated until the flap valve (120) has been displaced from its closed position (FIG. 2) to its partially open position (FIGS. 3 and 7); at the same time, the intake openings (102) of the nozzle (10) is guided by means of the wand portion (20) and the handle (112) to a position where it may suck up the burning flammable fluid or other incendiary matter (204).

It is apparent that there has been provided with this invention a novel Device for Removing Incendiary Matter from the Interior of an Aircraft which fully satisfies the objects, means and advantages as set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A device for disposing of flammable fluids and other incendiary material from the pressurized interior of an aircraft comprising:
    an intake nozzle;
    an intermediate wand portion having a longitudinal bore extending therethrough, said bore being in fluid communication with said nozzle;
    a flexible hose connected at the end of said intermediate wand portion bore remote from said intake nozzle;
    a quick connect fitting at the other end of said flexible hose and in fluid communication therewith;
    an outlet fitting adapted for forming a flow path for fluid communication with said quick connect fitting, said outlet fitting comprising
        a plug which when removed results in said outlet fitting being in fluid communication with the external airstream and
        means for removing said plug by ejecting it into said external airstream.

2. The device of claim 1 further comprising a flow regulator for regulating the flow through said nozzle when said quick connect fitting is attached to said outlet and said plug is removed.

3. The device of claim 2 wherein said flow regulator is provided with a compensating flow opening whereby the dynamic forces associated respectively with the flow through said compensating opening and through said intake nozzle tend to balance one another.

4. The device of claim 2 wherein said intermediate wand portion supports a control handle operatively connected to said flow regulator whereby the operator of the device may control the flow through the device with one hand while guiding it by said wand portion with another hand.

5. The device of claim 2 wherein said flow regulator balances the static forces resulting from the pressure differential between the pressure inside said cabin and the pressure of said external airstream such that said flow regulator control handle may be operated with a minimum of force.

6. The device of claim 1 wherein said plug ejecting means is a mechanical cutter for cutting a central plug portion out of a flush mounted disk as said quick connect fitting is inserted into said outlet fitting.

7. The device of claim 1 wherein said plug ejecting means is a pyrotechnic ring located about the periphery of a flush mounted disk, said ring being activated by an electrical current through a switch.

8. The device of claim 7 wherein said switch is a manually operated switch located in the vicinity of said outlet fitting.

9. The device of claim 8 wherein said switch is automatically activated by the insertion of said quick connect fitting into said outlet fitting.

* * * * *